(12) United States Patent
Rao et al.

(10) Patent No.: US 11,972,125 B2
(45) Date of Patent: Apr. 30, 2024

(54) MEMORY SUB-SYSTEM DYNAMIC QOS POOL

(71) Applicant: Micron Technology, Inc., Boise, ID (US)

(72) Inventors: Abhijit Krishnamoorthy Rao, Bangalore (IN); Ashok Kumar Yadav, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 258 days.

(21) Appl. No.: 17/467,099

(22) Filed: Sep. 3, 2021

(65) Prior Publication Data

US 2023/0074388 A1    Mar. 9, 2023

(51) Int. Cl.
*G06F 3/06*    (2006.01)

(52) U.S. Cl.
CPC .......... *G06F 3/0631* (2013.01); *G06F 3/0605* (2013.01); *G06F 3/0613* (2013.01); *G06F 3/0659* (2013.01); *G06F 3/0679* (2013.01)

(58) Field of Classification Search
CPC .... G06F 3/0631; G06F 3/0605; G06F 3/0613; G06F 3/0659; G06F 3/0679
See application file for complete search history.

(56) References Cited

U.S. PATENT DOCUMENTS

| | | |
|---|---|---|
| 6,654,363 B1 | 11/2003 | Li et al. |
| 8,645,605 B2 | 2/2014 | Subramaniyan et al. |
| 11,256,648 B1* | 2/2022 | Pan .................... G06F 13/4081 |
| 2003/0088685 A1 | 5/2003 | Lee |
| 2007/0038750 A1 | 2/2007 | Jorgensen |
| 2016/0034415 A1* | 2/2016 | Singh ...................... G06F 13/28 710/313 |
| 2018/0081832 A1* | 3/2018 | Longo ..................... H04L 67/10 |
| 2020/0050470 A1* | 2/2020 | Guo ....................... G06F 3/0607 |
| 2022/0350767 A1* | 11/2022 | McGraw ............. G06F 11/1423 |
| 2023/0051825 A1* | 2/2023 | Chang ................... G06F 3/0679 |

* cited by examiner

*Primary Examiner* — Sean D Rossiter
(74) *Attorney, Agent, or Firm* — Brooks, Cameron & Huebsch, PLLC

(57) ABSTRACT

A method includes receiving a request for an allocation of memory resources based on quality of service (QoS) parameters. The method further includes provisioning, via a QoS manager component, a plurality of physical functions to provide the requested allocation of resources. At least two of the plurality of physical functions can be provided to meet a QoS criteria.

16 Claims, 5 Drawing Sheets

MEMORY SUB-SYSTEM DYNAMIC QOS POOL

TECHNICAL FIELD

Embodiments of the disclosure relate generally to memory sub-systems, and more specifically, relate to memory sub-system dynamic QOS pools.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
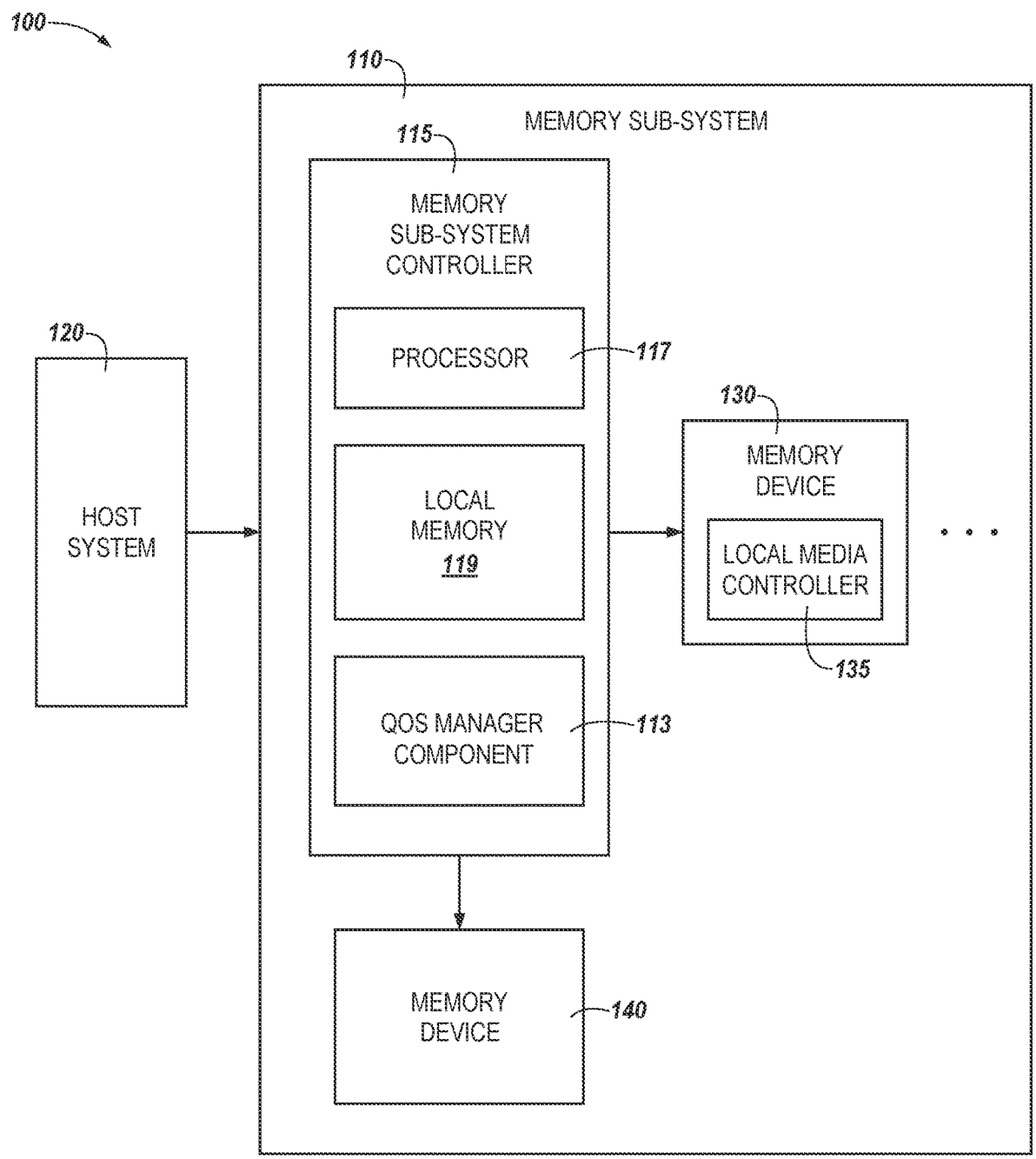
FIG. 1 illustrates an example computing system that includes a memory sub-system in accordance with some embodiments of the present disclosure.

Aspects of the present disclosure are directed to memory sub-system dynamic quality of service (QoS) pools, in particular to memory sub-systems that include a memory sub-system QoS manager component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation, a memory sub-system can use a multi-function PCIe storage device which, in some previous approaches, can provide performance of running an application using a physical function ("PF"). A multi-function PCIe storage device can expose itself as multiple standalone NVMe (non-volatile memory express) controllers to a host. An NVMe can be a host controller interface and storage protocol created to accelerate the transfer speed of data between enterprise and client systems and memory sub-systems (e.g., solid-state drives (SSDs)) over a computer's high-speed Peripheral Component Interconnect Express (PCIe) bus.

A physical function (PF) can be a PCIe function that can be discovered, enumerated, managed, and/or accessed like any other PCIe device. All physical functions can include a configuration space that specifies properties of the PCIe device and enables the host operating system (OS) or basic input output system (BIOS) to manage the specified properties. As an example, each of the physical functions can be recognized as an independent PCIe device that can be correlated to a non-volatile memory (NVM) namespace to make the physical function a PCIe device. A single PCIe based memory sub-system can host multiple physical functions that can each be seen as a separate controller within the single NVM memory sub-system. In some examples, each PF can be connected by a PCIe lane and whose bandwidth can be dependent on a PCIe interface.

In these previous approaches, a QoS of a single physical function can limit the performance of the application being run on the single physical function. The QoS capacity of an idle or unused physical function may remain unused due to a lack of an ability to provide the QoS functionality of that idle or unused physical function for use by an application. Therefore, the memory sub-system may remain underutilized and the ability to provide the most efficient QoS from each of the physical functions used can be limited.

Aspects of the present disclosure address the above and other deficiencies by creating groups of physical functions that can provide a QoS pool. Quality of service (QoS) refers to a description or measurement of overall performance of a service, such as a compute network or cloud computing service, particularly a performance seen by a user of the network. To quantitatively measure, several related aspects of the network service are often considered, such as packet loss, bit rate, throughput, transmission delay, availability, jitter, etc. In some examples, QoS can also refer to an ability to provide different priorities to different applications, users, or data flows, or to provide a certain level of performance to a data flow. A service level agreement (SLA) used to run an application can be provided on a QoS pool basis, using multiple physical functions that combine to provide a total QoS, instead of a single physical function basis. This can allow the memory sub-system to dedicate pools of high QoS physical functions to applications that use higher performance by dynamically grouping the high QoS physical functions together within the memory sub-system. As used herein, "dynamically" can refer to increasing or decreasing a group of QoS physical functions based on a request to use memory resources that consume a particular quantity of QoS. As an example, a physical function with a particular QoS functionality can be dynamically added to a group of physical functions to provide a QoS pool and, likewise, a physical function with a particular QoS functionality that may no longer be needed can be dynamically removed from the QoS pool, each based on a particular physical function being used for a particular QoS used by a host or application. The functionality of these QoS pools can be provided using vendor specific commands. Further, these QoS pools can be dynamically changed by adding or removing physical functions with particular QoS parameters into or out of a particular QoS pool based on a corresponding SLA or other requests and performance provisions.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a quality of service (QoS) manager component 113. Although not shown in FIG. 1 so as to not obfuscate the drawings, the QoS manager component 113 can include various circuitry, firmware, and/or software to facilitate monitoring and control of QoS parameters for a memory sub-system and/or components of the memory sub-system, determining whether to perform QoS operations for the memory sub-system and/or components of the memory sub-system based on service level agreements (SLAs), data usage, data requirements of an application, etc., of the memory sub-system and/or components of the memory sub-system, and/or controlling pools of physical functions (PFs) for QoS operations for the memory sub-system and/or the components of the memory sub-system. In some embodiments, the QoS manager component 113 can include special purpose circuitry in the form of an ASIC, FPGA, state machine, and/or other logic circuitry that can allow the QoS manager component 113 to orchestrate and/or perform operations to selectively perform QoS operations for the memory device 130 and/or the memory device 140 based on determined SLA and/or QoS requests, requirements, etc. and data usage parameters.

In some embodiments, the memory sub-system controller 115 includes at least a portion of the QoS manager component 113. For example, the memory sub-system controller 115 can include a processor 117 (processing device) configured to execute instructions stored in local memory 119 for performing the operations described herein. In some embodiments, the QoS manager component 113 is part of the host system 110, an application, or an operating system.

In a non-limiting example, an apparatus (e.g., the computing system 100) can include a memory sub-system QoS manager component 113. The memory sub-system QoS manager component 113 can be resident on the memory sub-system 110. As used herein, the term "resident on" refers to something that is physically located on a particular component. For example, the memory sub-system QoS manager component 113 being "resident on" the memory sub-system 110 refers to a condition in which the hardware circuitry that comprises the memory sub-system QoS manager component 113 is physically located on the memory sub-system 110. The term "resident on" can be used interchangeably with other terms such as "deployed on" or "located on," herein.

The memory sub-system QoS manager component 113 can be configured to determine a QoS pool for a group of physical functions (PFs) for allocating QoS services for usage of memory components of the memory sub-system and determine that a particular QoS pool is allocated for use by a user based on SLAs, application requirements, etc. As described above, the memory components can be memory dice or memory packages that form at least a portion of the memory device 130. A QoS pool can be formed by aggregating QoS allotted to multiple individual PFs and by forming dynamic, or changeable, QoS pools during runtime. This can be similar to a cluster of PFs where once a QoS is formed and the SLA is based on the QoS pool and not on a capability (for example, an input/output per second (IOPS) or bandwidth (BW)) of an individual PF. The QoS pool can have an upper and lower criteria based on QoS parameters or numbers. The QoS configuration can be set to a standard configuration on a first boot up and can subsequently be changed based on an SLA requirement of an application. For example, the application can be ensured to run using a QoS pool capable of running the application and meeting the SLA requirements to do so. As a further example, the application or group of applications can be correlated to a PF, whereas the PF by itself is not limited by its initial QoS parameters. The QoS pool, on behalf of the PF, can increase or decrease capability based on the QoS pool capabilities and changing demand to acquire higher IOPS and BW parameters of the QoS pool (and thereby more than one PF).

In some embodiments, a PF can be assigned a bandwidth (BW) and input/output per second (IOPS) quantities, the upper criterion and the lower criterion of the QoS parameters being dependent on the QoS pool of PFs. The QoS manager component 113 can monitor and control the division of the QoS parameters across the PFs in the QoS pool of PFs. The QoS manager component 113 can be notified via a vendor specific API by the application which is associated with the PF for improved QoS parameters. The QoS manager component 113 can provision higher QoS parameters to a particular PF in the QoS pool that needs higher QoS parameters to perform.

Figure 2:
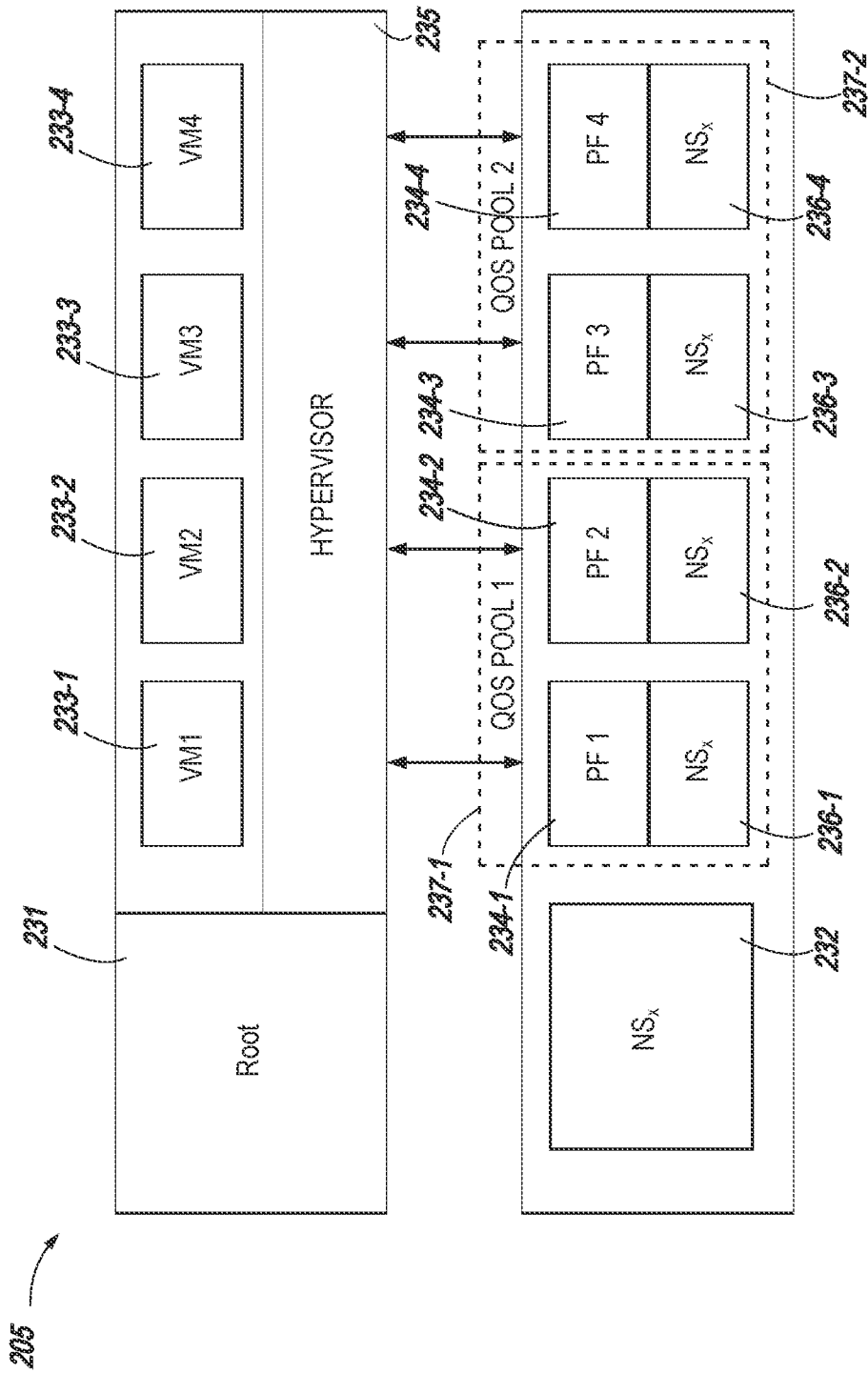
FIG. 2 is a block diagram of an example computing system including QOS pools in accordance with some embodiments of the present disclosure.

FIG. 2 is a block diagram of an example computing system 205 including QOS pools 237-1, 237-2 in accordance with some embodiments of the present disclosure. The computing system 205 can include a root component 231, a plurality of virtual machines (VMs) 233-1, 233-2, 233-3, 233-4 (hereinafter referred to collectively as plurality of VMs 233), and a hypervisor 235. The root component 231 can refer to a device driver in the host that can send privileged commands to manage physical functions, such as plurality of physical functions 234 described below. This device driver can send a command to each of the physical functions. The hypervisor 235 can be hardware, software, and/or firmware capable of creating virtual machines, such as the plurality of VMs 233, and managing and allocating the plurality of VMs' 233 resources. The plurality of VMs 233 are machines set up to use resources of the host (such as host system 120 in FIG. 1).

A plurality of physical functions (PFs) 234-1, 234-2, 234-3, 234-4 (hereinafter referred to collectively as plurality of PFs 234) can be allocated to each of the plurality of VMs 233 based on QoS requests or demands by a user. Each of the plurality of PFs 234 can be connected to a particular non-volatile memory namespace, such as namespaces ("NS$_x$") 236-1, 236-2, 236-3, 236-4. For example, PF1 234-1 can be connected to namespace 236-1, PF2 234-2 can be connected to namespace 236-2, etc. The namespace 232 can be associated with an admin controller and can be used to send privileged admin commands and is managed by an admin controller in the device (e.g., PF 0). The admin controller can receive privileged admin commands from a device driver that enables management of other physical functions. However, embodiments are not so limited. For example, in some embodiments, namespaces are removed and not used for sending admin commands.

In some previous approaches where a QoS manager component is not present, a VM (such as VM 233-1) can be associated with a single PF (such as PF1 234-1) and the QoS parameters of the single PF are the QoS resources allocated to the corresponding VM. In this way, in the situation where a VM (such as VM2 233-2) is not being used, the PF (such as PF2 234-2) and its associated QoS resources of the unused VM may not be allocated to an additional VM (such as VM 2 233-2). However, in the description provided herein, a QoS Pool 1 237-1 that includes both PF1 234-1 and PF2 234-2 can use the QoS resources of both PF1 234-1 and/or PF2 234-2 and provide the QoS resources of either or both to a single VM, such as VM1 233-1 or VM2 233-2. In this way, a QoS pool 1 237-1 and its associated QoS resources can be allocated to a VM and a second QoS pool 2 237-2 and its associated QoS resources can be allocated to an additional VM. A QoS manager component (such as QoS manager component 113 in FIG. 1.) can manage, monitor, and modify the QoS pools. For example, as will be described in association with FIG. 3 below, a PF can be added or deleted from a QoS pool in order to meet a particular SLA or QoS resource demands.

Figure 3:
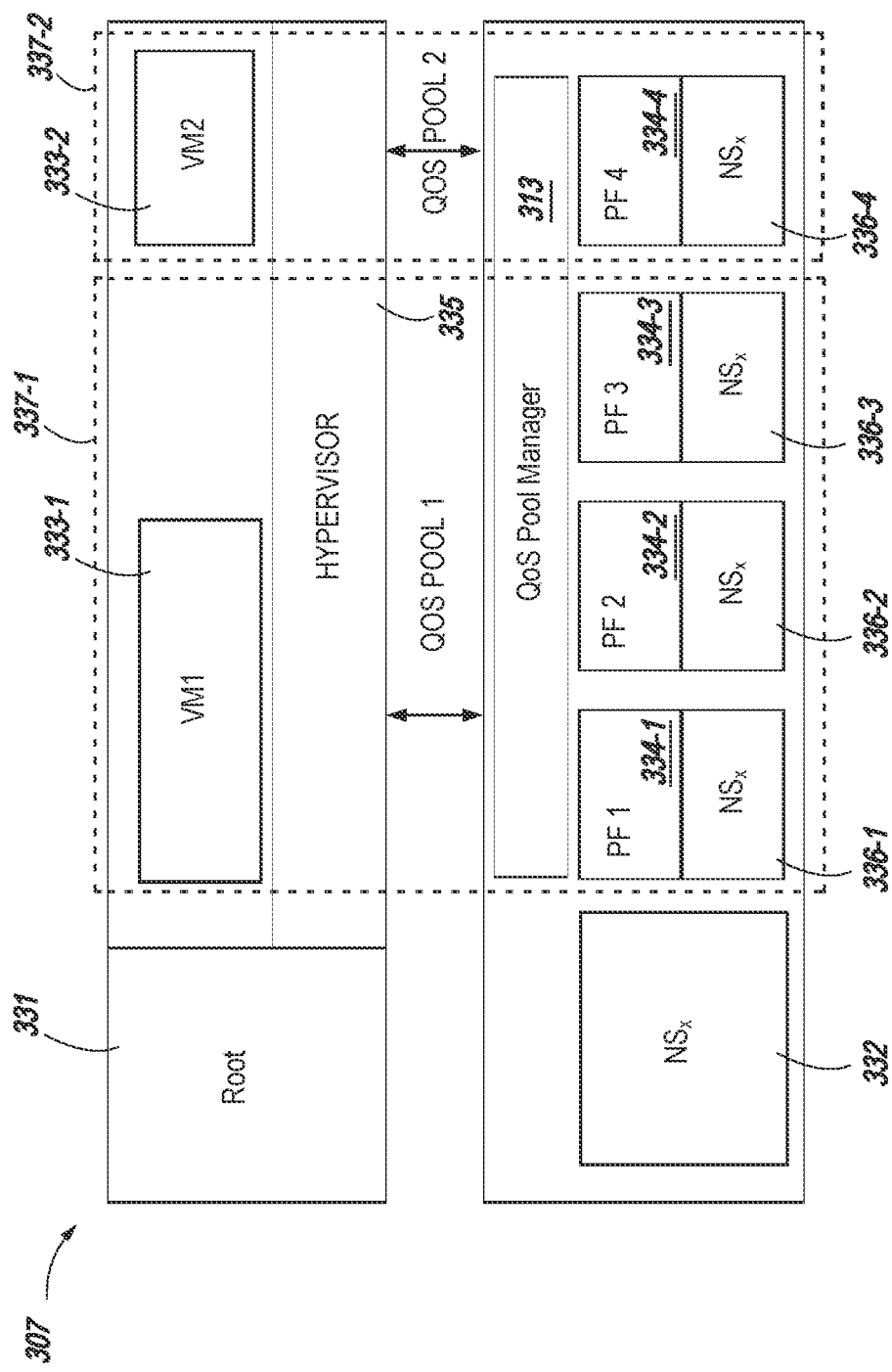
FIG. 3 is a block diagram of an example computing system including QOS pools in accordance with embodiments of the present disclosure.

FIG. 3 is a block diagram of an example computing system 307 including QOS pools 337-1, 337-2 in accordance with some embodiments of the present disclosure. The computing system 307 can include a root component 331, a plurality of virtual machines (VMs) 333-1, 333-2 (hereinafter referred to collectively as plurality of VMs 333), and a hypervisor 335. The root component 331 can refer to a device driver in the host that can send privileged commands to manage physical functions, such as plurality of physical functions 234 described below. This device driver can send a command to each of the physical functions. The hypervisor 335 can be hardware, software, and/or firmware capable of creating virtual machines, such as the plurality of VMs 333, and managing and allocating the plurality of VMs' 333 resources. The plurality of VMs 333 are machines set up to use resources of the host (such as host system 120 in FIG. 1).

A plurality of physical functions (PFs) 334-1, 334-2, 334-3, 334-4 (hereinafter referred to collectively as plurality of PFs 334) can be allocated to each of the plurality of VMs 333 based on QoS requests or demands by a user. Each of the plurality of PFs 334 can be connected to a particular non-volatile memory namespace, such as namespaces ("NS$_x$") 336-1, 336-2, 336-3, 336-4. For example, PF1 334-1 can be connected to namespace 336-1, PF2 334-2 can be connected to namespace 336-2, etc. Namespace 332 can be associated with an admin controller and can be used to send privileged admin commands and is managed by an admin controller in the device (e.g., PF 0). The admin controller can receive privileged admin commands from a device driver that enables management of other physical functions. However, embodiments are not so limited. For example, in some embodiments, namespaces are removed and not used for sending admin commands.

In some embodiments, as is illustrated in FIG. 3, a QoS Pool 1 337-1 that includes PF1 334-1, PF2 334-2, and PF3 334-3 can use the QoS resources of the three PFs 334-1, 334-2, 334-3 and provide the QoS resources of the three PFs to VM1 333-1 while QoS Pool 2 337-2 and its QoS resources of PF4 334-4 is provided to VM2 333-2. either or both to a single VM, such as VM1 233-1 or VM2 233-2. In this way, a QoS pool 1 337-1 with greater QoS resources can be provided to a VM, such as VM1 333-1, with greater QoS demands or requests. Likewise, a QoS Pool 2 337-2 with fewer QoS resources can be provide to a VM, such as VM2 333-2, with fewer QoS demands or requests.

In some embodiments, a PF can be added or removed from a QoS pool. For example, the transition from QoS Pool 1 237-1 of FIG. 2 to QoS Pool 1 337-1 of FIG. 3 can include adding PF3 234-3 to QoS Pool 1 237-1 and removing PF3 234-3 from QoS Pool 2 237-2, resulting in what is illustrated in FIG. 3. and its associated QoS resources can be allocated to a VM and a second QoS pool 2 237-2 and its associated QoS resources can be allocated to an additional VM. A QoS manager component (such as QoS manager component 113 in FIG. 1.) can manage, monitor, and modify the QoS pools. For example, as will be described in association with FIG. 3 below, a PF can be added or deleted from a QoS pool in order to meet a particular SLA or QoS resource demands.

Such an addition or removal can occur if an inactive PF is available outside a QoS pool and another VM may be able to use the QoS resources of the inactive PF. In this way, the inactive PF can be added to a different QoS pool that is active and its QoS capacity can be transferred to the active QoS pool that may require a higher QoS parameter. In some examples, an application can request generation of a pool of PFs that can be combined to form a particular QoS pool. The application can view this pool as a high performing QoS pool whose QoS is higher than any individual PF. An application can communicate with the QoS manager component 313 using vendor specific API which informs the QoS manager component 313 of the dynamic QoS needs of each application. In some examples, this does not require the system to be stopped and restarted. As a host workload varies over time, particular PFs may remain unused for brief or extended periods of time. Inclusion of unused QoS resources in QoS pools can allow for greater improvement in QoS distribution for PFs which may anticipate higher workloads, thus resulting in a better use of otherwise idle QoS resources.

Figure 4:
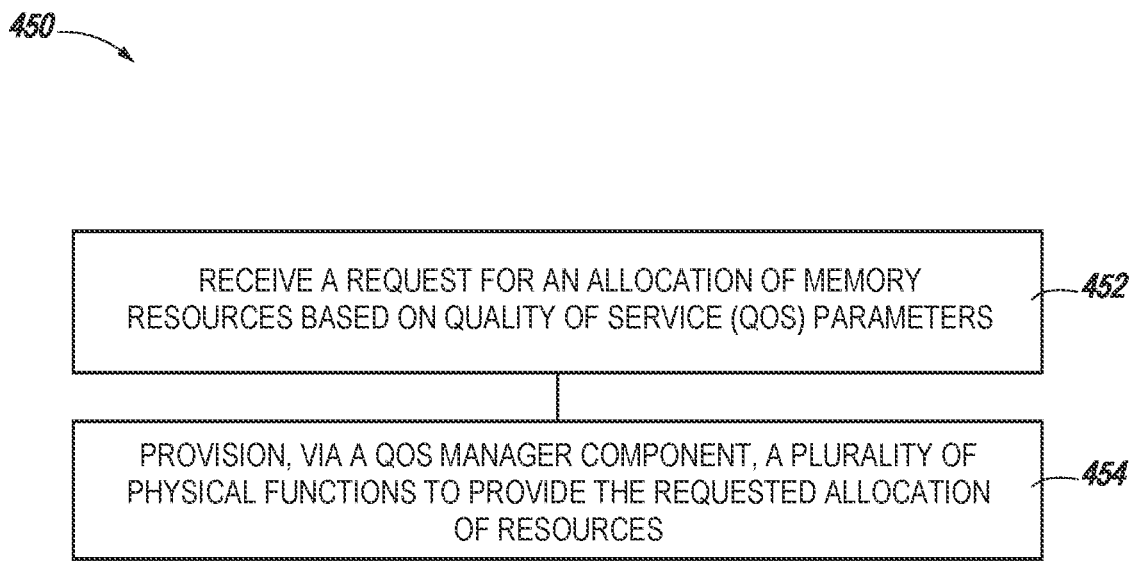
FIG. 4 is an example method for providing QOS pools in accordance with embodiments of the present disclosure.

FIG. 4 is flow diagram corresponding to a method 450 for memory dice arrangement in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the QoS manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, a request for an allocation of memory resources based on quality of service (QoS) parameters can be received. The request can be received at a QoS manager component. In some embodiments, the QoS manager component can be analogous to QoS manager component 113 in FIG. 1. At least two of the plurality of physical functions can be provided to meet a QoS criteria of the QoS parameters. The QoS parameters can include at least one of an input/output per second (IOPS) rate of data and/or a bandwidth and the QoS criteria can be a threshold quantity of the IOPS and/or bandwidth.

At operation 454, a plurality of physical functions (PFs) can be provisioned via the QoS manager component, to provide the requested allocation of resources. The plurality of PFs can be provisioned as a QoS pool of memory resources. In some embodiments, the method 450 can include updating the provision of the plurality of physical functions by adding an additional physical function to the QoS pool of memory resources. The additional physical function can be added to the QoS pool of memory resources in response to fewer memory resources being used to satisfy the QoS parameters. In some embodiments, the method 450 can include updating the provision of the plurality of physical functions by removing an additional physical function from the QoS pool of memory resources. The additional physical function is removed from the QoS pool of memory resources in response to more memory resources being used to satisfy the QoS parameters.

Figure 5:
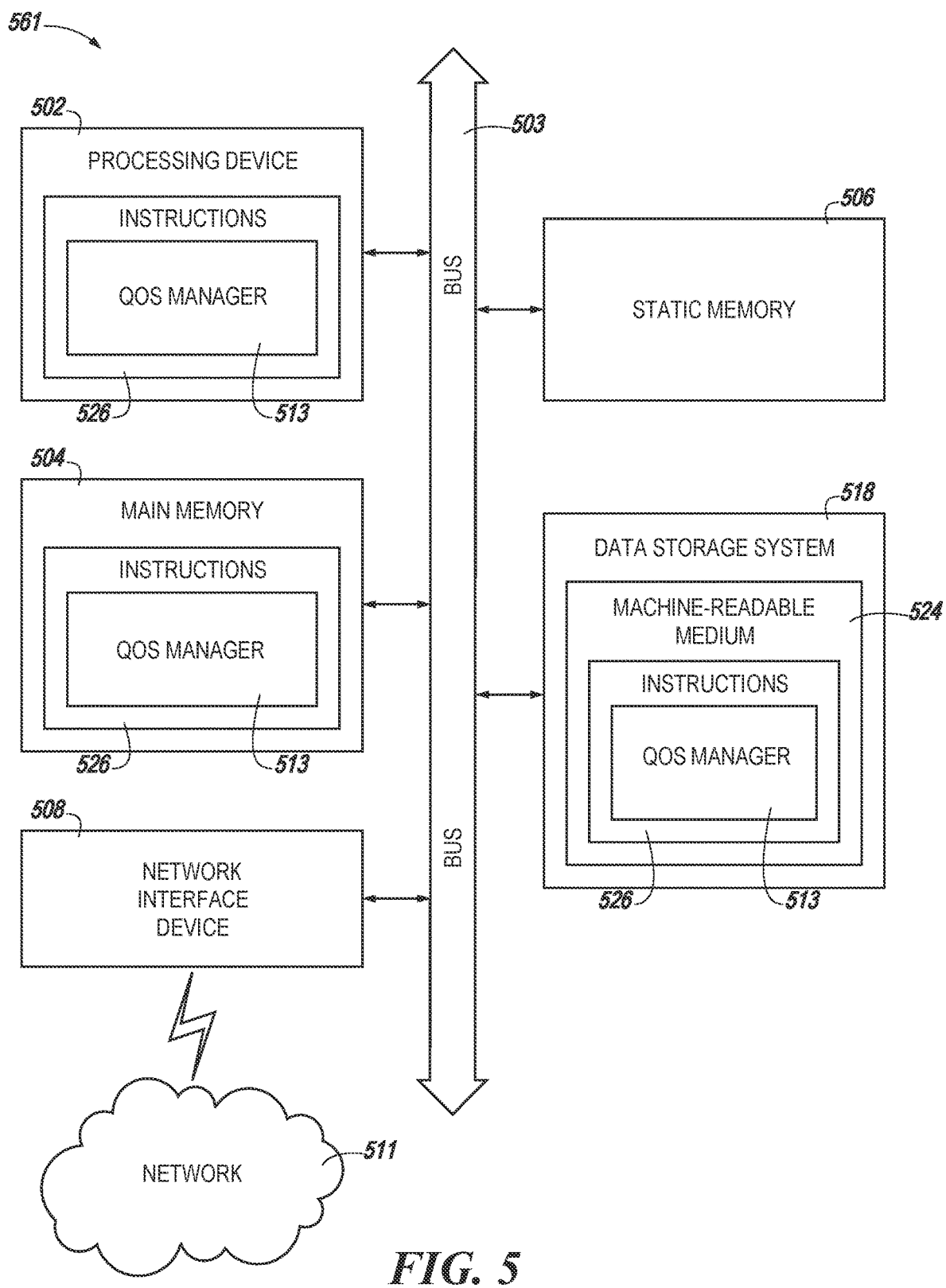
FIG. 5 is an example computer system for providing QOS pools in accordance with embodiments of the present disclosure.

FIG. 5 is a block diagram of an example computer system 561 in which embodiments of the present disclosure may operate. For example, FIG. 4 illustrates an example machine of a computer system 561 within which a set of instructions, for causing the machine to perform any one or more of the methodologies discussed herein, can be executed. In some embodiments, the computer system 561 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the QoS manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 561 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 561 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 561, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a QoS manager component (e.g., the QoS manager component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a request for an allocation of memory resources based on quality of service (QoS) parameters; and
provisioning, via a QoS manager component, a plurality of physical functions to provide the requested allocation of resources;
wherein at least two of the plurality of physical functions are provided to meet a QoS criteria;
wherein the plurality of physical functions are provisioned as a QoS pool of memory resources; and
updating the provision of the plurality of physical functions by removing an additional physical function from the QoS pool of memory resources in response to more memory resources being used to satisfy the QoS parameters.

2. The method of claim 1, wherein the QoS parameters comprise at least one of an input/output per second (IOPS) rate of data and a bandwidth.

3. The method of claim 1, further comprising updating the provision of the plurality of physical functions by adding an additional physical function to the QoS pool of memory resources.

4. The method of claim 3, wherein the additional physical function is added to the QoS pool of memory resources in response to fewer memory resources being used to satisfy the QoS parameters.

5. An apparatus, comprising:
a memory sub-system quality of service (QoS) manager component to perform operations comprising:
receiving a request for an allocation of memory resources based on a quality of service (QoS);
allocating a QoS pool comprising a plurality of physical functions, wherein the plurality of physical functions each comprise a QoS attribute that adds to a total QoS capacity of the QoS pool; and
dynamically adding at least one physical function to the plurality of physical functions of the QoS pool in response to receiving an updated request for an additional allocation of memory resources; and
maintaining a physical function not allocated in the QoS pool as an unused physical function until the QoS is requested to be increased.

6. The apparatus of claim 5, wherein:
the QoS attribute comprises at least one of an input/output per second (IOPS) rate and a bandwidth (BW);
the IOPS rate and BW is set for each of the plurality of physical functions.

7. The apparatus of claim 6, wherein the allocation of memory resources is based on a percentage of a totally capability of a memory sub-system.

8. The apparatus of claim 6, wherein the QoS manager component is to perform operations comprising altering at least one of the IOPS and the BW during runtime for a particular one of the plurality of physical functions using vendor specific commands.

9. The apparatus of claim 5, wherein the QoS manager component is to perform operations comprising aggregating multiple physical functions of the plurality of physical functions to form the QoS pool as a dynamic QoS pool during run-time.

10. A system, comprising:
a plurality of memory components arranged to form a stackable cross-gridded array of memory cells; and
a processing device coupled to the plurality of memory components, the processing device to perform operations comprising:
receiving a request for allocation of memory resources based on a QoS used to perform particular memory operations;
providing the requested memory resources by allocating a plurality of physical functions to allocate a QoS pool to provide the QoS;
receiving an updated request for allocation of additional memory resources, wherein the additional memory resources are fewer than the initially requested memory resources;
removing a physical function from the QoS pool comprising the plurality of physical functions, wherein the removal of the physical function decreases performance of the QoS.

11. The system of claim 10, wherein the processing device is to perform operations comprising adding a physical function to the QoS pool in response to a further request for allocation of additional memory resources.

12. The system of claim 10, wherein the allocation of the plurality of physical functions comprises allocating a plurality of namespaces of a memory sub-system.

13. The system of claim 10, wherein the memory components are within a multi-function peripheral component interconnect express (PCIe) storage device.

14. The system of claim 13, wherein:
the multi-function PCIe storage device is accessed as multiple non-volatile memory controllers; and
PCIe functions of the multi-function PCIe storage device are within a single physical memory device.

15. The system of claim 10, wherein the plurality of physical functions are allocated independent of a host determining which physical functions to use in order to provide the QoS.

16. An apparatus, comprising:
a memory sub-system quality of service (QoS) manager component to perform operations comprising:
receiving a request for an allocation of memory resources based on a quality of service (QoS);
allocating a QoS pool comprising a plurality of physical functions, wherein the plurality of physical functions each comprise a QoS attribute that adds to a total QoS capacity of the QoS pool; and
dynamically adding at least one physical function to the plurality of physical functions of the QoS pool in response to receiving an updated request for an additional allocation of memory resources, wherein the QoS manager component is to perform operations comprising allocating the QoS pool based on a service level agreement (SLA) per each of the plurality of physical functions and the SLA is based on a lower threshold and an upper threshold value of the QoS.

* * * * *